(12) United States Patent
Roberts

(10) Patent No.: US 6,839,523 B1
(45) Date of Patent: Jan. 4, 2005

(54) MONITORING DISTRIBUTED GAIN IN AN OPTICAL TRANSMISSION SYSTEM

(75) Inventor: Kim B. Roberts, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 623 days.

(21) Appl. No.: 09/852,777

(22) Filed: May 11, 2001

(51) Int. Cl.[7] .............................................. H04B 10/02
(52) U.S. Cl. ...................... 398/177; 398/31; 398/32; 398/37; 398/38; 398/28; 398/29; 398/173; 398/174; 398/175; 398/176; 359/333; 359/334; 359/349
(58) Field of Search ............................. 398/31, 32, 37, 398/38, 29, 157, 173–177, 25, 33; 359/333

(56) References Cited

U.S. PATENT DOCUMENTS

| | | | |
|---|---|---|---|
| 5,513,029 A | 4/1996 | Roberts | ...................... 359/177 |
| 5,963,312 A * | 10/1999 | Roberts | ...................... 356/73.1 |
| 6,064,501 A | 5/2000 | Roberts et al. | ............. 359/110 |
| 6,072,614 A * | 6/2000 | Roberts | ...................... 398/177 |
| 6,111,676 A * | 8/2000 | Lemus et al. | .................. 398/1 |
| 6,181,464 B1 * | 1/2001 | Kidorf et al. | ............... 359/334 |
| 6,327,250 B1 * | 12/2001 | Chen et al. | ................. 370/241 |
| 6,417,958 B1 * | 7/2002 | Du et al. | ..................... 359/334 |
| 6,574,037 B2 * | 6/2003 | Islam et al. | ................. 359/334 |
| 6,633,712 B2 * | 10/2003 | Dennis et al. | .............. 385/123 |

OTHER PUBLICATIONS

V.J. Mazurczyk et al. IEEE Photonics Technology Letters, vol. 12. No. 11, Nov. 2000. "Accumulation of Gain Tilt in WDM Amplified Systems Due to Raman Crosstalk."*
Ming–Seng Kao. Journal of Lightware Technology. vol. 7, No. 9 Sep. 1989. "Signal Light Amplification by Stimulated Raman Scattering in an N–Channel WDM Optical Fiber Communication System."*

* cited by examiner

*Primary Examiner*—Leslie Pascal
*Assistant Examiner*—Chau M. Nguyen
(74) *Attorney, Agent, or Firm*—Kent Daniels; Ogilvy Renault

(57) ABSTRACT

In a method and system for evaluating distributed gain in an optical transmission system, a data signal and a residual pump laser signal propagating in opposite directions within a waveguide are monitored. Modulation of the residual pump laser signal is correlated with low frequency components of the data signal. This correlation is used to determine cross-talk between the data signal pump laser signals, as a function of location within the waveguide. The distributed gain is then evaluated from the cross-talk, using a known relationship, or proportionality, between gain and cross-talk.

20 Claims, 3 Drawing Sheets

MONITORING DISTRIBUTED GAIN IN AN OPTICAL TRANSMISSION SYSTEM

CROSS-REFERENCE TO RELATED APPLICATIONS

This is the first application filed for the present invention.

MICROFICHE APPENDIX

Not Applicable.

TECHNICAL FIELD

The present invention relates to optical transmission systems for optical communications, and in particular to a method and system for monitoring distributed gain in an optical transmission system.

BACKGROUND OF THE INVENTION

Optical transmission systems for optical communications typically include a pair of network nodes connected by an optical waveguide (i.e. fiber) link. Within each network node, optical signals are converted into electrical signals for signal regeneration and/or routing. Exemplary network nodes of this type include add-drop-multiplexers (ADMs), routers, and cross-connects. The optical link between the network nodes typically comprises multiple spans (e.g. of 40–60 km in length) interconnected by optical devices such as Erbium amplifiers which operate to extend the signal reach within the link.

Traditionally, optical devices have been implemented as discrete components coupled between adjoining spans. Thus, for example, optical signals are progressively attenuated as they propagate through a span, amplified by an optical amplifier prior to being launched into the next adjoining span. A disadvantage of discrete optical devices is that the link is discontinuous at the device, in that the waveguide must be severed and coupled to the optical device. This discontinuity leads to problems such as signal reflection and scattering, both of which tend to degrade the performance of the link. An additional disadvantage of the use of discrete optical devices is that power (typically electrical) must be supplied to the optical device, thereby increasing equipment costs. It is therefore desirable to minimize the number of discrete optical devices within a link.

One method of reducing the number discrete optical devices within a link is to pre-amplify data signals within the waveguide upstream of each device, and thereby increase the length of each span. This can be accomplished by exploiting Raman scattering phenomena to couple power from a pump laser to data signals within the waveguide. Typically, the pump laser is injected into the waveguide near the output end of the span (that is, near the discrete optical device which is receiving data signals) and propagates in a reverse direction, opposite to the propagation direction of the data signals. Optical pre-amplification in this manner is typically referred to as "Raman amplification" or "Raman pumping", and has the effect of increasing the signal to noise (S/N) ratio at the input of the receiving optical device, thereby enabling an increased span length between adjacent optical devices within a link.

A characteristic feature of Raman pumping is that the signal gain is distributed within the span, typically within a gain region extending up to 10 km or more (depending principally on the waveguide properties and the pump power) from the injection point of the pump laser. In general, gain due to Raman pumping is a maximum at the injection point of the pump laser, and decays exponentially with distance away from the injection point. Thus the length of the gain region is normally based on an arbitrary gain threshold, rather than any distinct transition of signal gain within the waveguide. Furthermore, signal gain is a function of both pump injection power and position within the gain region, and it is difficult to determine the distribution of gain as a function of length.

In particular, it is possible to measure data signal power at the extreme ends of the waveguide, and therefore obtain net attenuation or gain through the waveguide. However, without a measure of the signal power prior to entering the gain region, the gain produced by Raman pumping cannot be determined.

U.S. Pat. No. 6,072,614 (Roberts) teaches a method of determining signal attenuation as a function of length along a waveguide. However, this technique relies on detection of counter-propagating signals due to various scattering phenomena (e.g. stimulated Brillouin scattering and Rayleigh scattering) and cannot provide any information concerning gain due to Raman pumping. In principle, the method of U.S. Pat. No. 6,072,614 can be used to estimate signal power prior to entering the gain region. However, the boundary of the gain region is generally indistinct, and its location may not be known in advance.

One technique for determining gain distribution within a waveguide is known as the "cut-back" method. In this technique, the waveguide is progressively shortened by cutting pieces from the input end of the waveguide, and the resulting changes in measured signal power at the receiving end of the waveguide used to determine gain as a function of waveguide length. This technique is suitable for laboratory testing. However, it is clearly not suitable for installed links, which must necessarily be provisioned with a fixed geographical length. Furthermore, since this technique necessarily results in the destruction of the waveguide, its results can only be used as an estimate of the performance of installed fibers, as manufacturing variations may produce differing optical performance in different fibers.

Accordingly, a method and system for non-destructively monitoring distributed gain as a function of length along a waveguide remains highly desirable.

SUMMARY OF THE INVENTION

An object of the present invention is to provide a method and system for non-destructively monitoring distributed gain as a function of length along an optical waveguide.

Accordingly, an aspect of the present invention provides a method of monitoring distributed gain in an optical waveguide. Cross-talk between a first optical signal and a second optical signal as a function of location within the waveguide is determined. The distributed gain is then evaluated from the cross-talk.

Another aspect of the present invention provides a system adapted to monitor distributed gain in an optical waveguide. The system comprises: means for determining cross-talk between a first optical signal and a second optical signal as a function of location within the waveguide; and means for evaluating the distributed gain from the cross-talk.

In embodiments of the invention, the first optical signal may be a data signal, and the second optical signal may be a pump laser signal.

In embodiments of the invention, cross-talk between the first optical signal and the second optical signal can be determined by monitoring at a predetermined detection point a low frequency component of the first optical signal, and a low frequency modulation of the second optical signal consistent with the low frequency component of the first optical signal. A correlation may be calculated as a function of time delay between transmission of the low frequency component of the first optical signal past the detection point and reception of the low frequency modulation of the second optical signal. Finally, cross-talk as a function of length along the waveguide can be evaluated from the power distribution.

Preferably, the predetermined detection point is located up-stream of a gain region of the waveguide, relative to a propagation direction of the first optical signal.

The low frequency component of the data signal may be any one of: an energy spectrum of the first optical signal; optical power dither of the first optical signal; optical frequency dither of the first optical signal; and rotation of a polarization direction of the first optical signal. In preferred embodiments, the low frequency component of the first optical signal has a frequency on the order of $10^6$ Hz, or less.

The low frequency modulation of the second optical signal may be an optical power modulation of the second optical signal, and has a frequency corresponding to that of the monitored low frequency component of the first optical signal.

In embodiments of the invention, the correlation of the low frequency modulation of the second optical signal can be determined by sampling the low frequency component of the first optical signal, and the low frequency modulation of the second optical signal. Power distribution data representative of the correlation may then be calculated using the sampled low frequency component of the first optical signal and the low frequency modulation of the second optical signal. In preferred embodiments, a first Fast Fourier Transform of the sampled low frequency component of the first optical signal, as a function of time, is calculated. A corresponding second Fast Fourier Transform of the sampled low frequency modulation of the second optical signal, as a function of time, is also calculated. Multiplication of the first and second Fast Fourier Transforms generates a correlation transform, which can be inverse-transformed to calculate the power distribution data.

In embodiments of the invention, evaluation of cross-talk as a function of length can be accomplished by removing an effect of attenuation of the second optical signal from the power distribution. Time delay may also be converted into a distance relative to the detection point.

In embodiments of the invention, evaluation of the distributed gain from the cross-talk may include applying a predetermined proportionality constant to the cross-talk.

Thus the present invention provides a method and a system for monitoring distributed gain as a function of length in an optical transmission system. A data signal and a residual pump laser signal propagating in opposite directions within a waveguide are monitored. Modulation of the residual pump laser signal is correlated with low frequency components of the data signal. This correlation is used to determine cross-talk between the data signal pump laser signals, as a function of location within the waveguide. The distributed gain is then evaluated from the cross-talk, using a known relationship, or proportionality, between gain and cross-talk. The data and residual pump laser signals are monitored at a single, selected monitoring point, which may conveniently be located proximal a sending node of the optical transmission system. The distributed gain is evaluated by analysis of the monitored signals, without disturbing data traffic in the optical transmission system. As a result, the method and system of the invention may be employed in installed (and operational) optical transmission systems.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
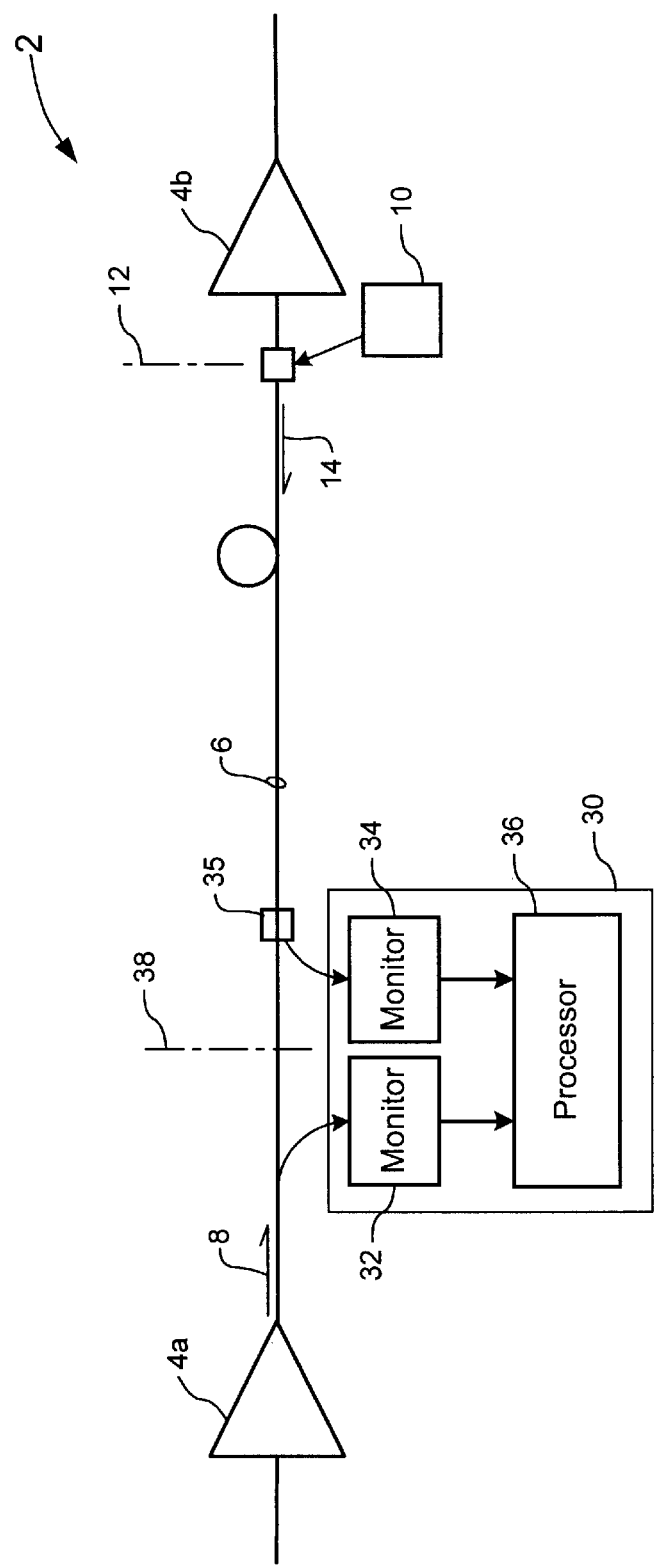
FIG. 1 is a block diagram schematically illustrating principal elements of an exemplary optical transmission system in which the present invention may be deployed, and including a system for monitoring distributed gain in accordance with an embodiment of the present invention.

The present invention provides a method and system for monitoring distributed gain in an optical transmission system. In general, cross-talk between a data signal and a pump laser signal is evaluated as a function of location within the optical transmission system. The distributed gain is evaluated from the cross-talk. FIG. 1 is a block diagram schematically illustrating principle elements of an exemplary optical transmission system in which the present invention may be deployed.

As shown in FIG. 1, the optical transmission system 2 comprises a pair of network nodes 4a and 4b interconnected by a waveguide 6. The network nodes 4 may be any discrete optical or electro-optical network devices (such as, for example, optical amplifiers, routers, add-drop multiplexers, etc) known in the art. Similarly, the waveguide 6 may be provided as one or more spans of optical fiber, as is well known in the art. For the purposes of description of the present invention, the optical transmission system 2 is illustrated as comprising a single fiber span connecting a pair of optical amplifiers. However, it will be understood that the present invention is not limited to such embodiment.

In general, traffic in the waveguide 6, may be bi-directional. However, in order to simplify the following description of the invention, data traffic with the waveguide 6 will be considered to be uni-directional, being launched into the waveguide 6 by a sending node 4a, and propagating in a so-called "forward" direction 8 through the waveguide 6 to a receiving node 4b.

Referring to FIG. 1, a pump laser 10 is coupled to the waveguide 6 in order to enable amplification of the data signal as it approaches the receiving node 4b, and thereby permit a longer span of the waveguide 6. Thus, the pump laser 10 operates, as is well known in the art, to launch a pump laser signal (having a substantially constant optical power) into the waveguide 6, at an injection point 12 proximal the receiving node 4b, and propagating in a "reverse" direction 14 toward the sending node 4a. It will be appreciated that the pump laser signal may be a simple optical signal having a known wavelength, polarization and power, or alternatively may be composed of multiple optical signals with respective different wavelengths, polarizations and optical power levels. These optical signals may be generated by one or more pump laser sources, and may be processed to produce a composite pump laser signal having, for example, a predetermined energy spectrum. However, in order to simplify description of the present invention, a single pump laser 10 is illustrated, which operates to generate a respective single pump laser signal propagating in the reverse direction 14 of the waveguide 6.

As is well known in the art, Raman scattering phenomena causes a coupling of optical power from the pump laser signal to the data signal, which manifests itself as amplification of the data signal. The effect of Raman pumping is illustrated in FIG. 2.

Figures 2, 3:
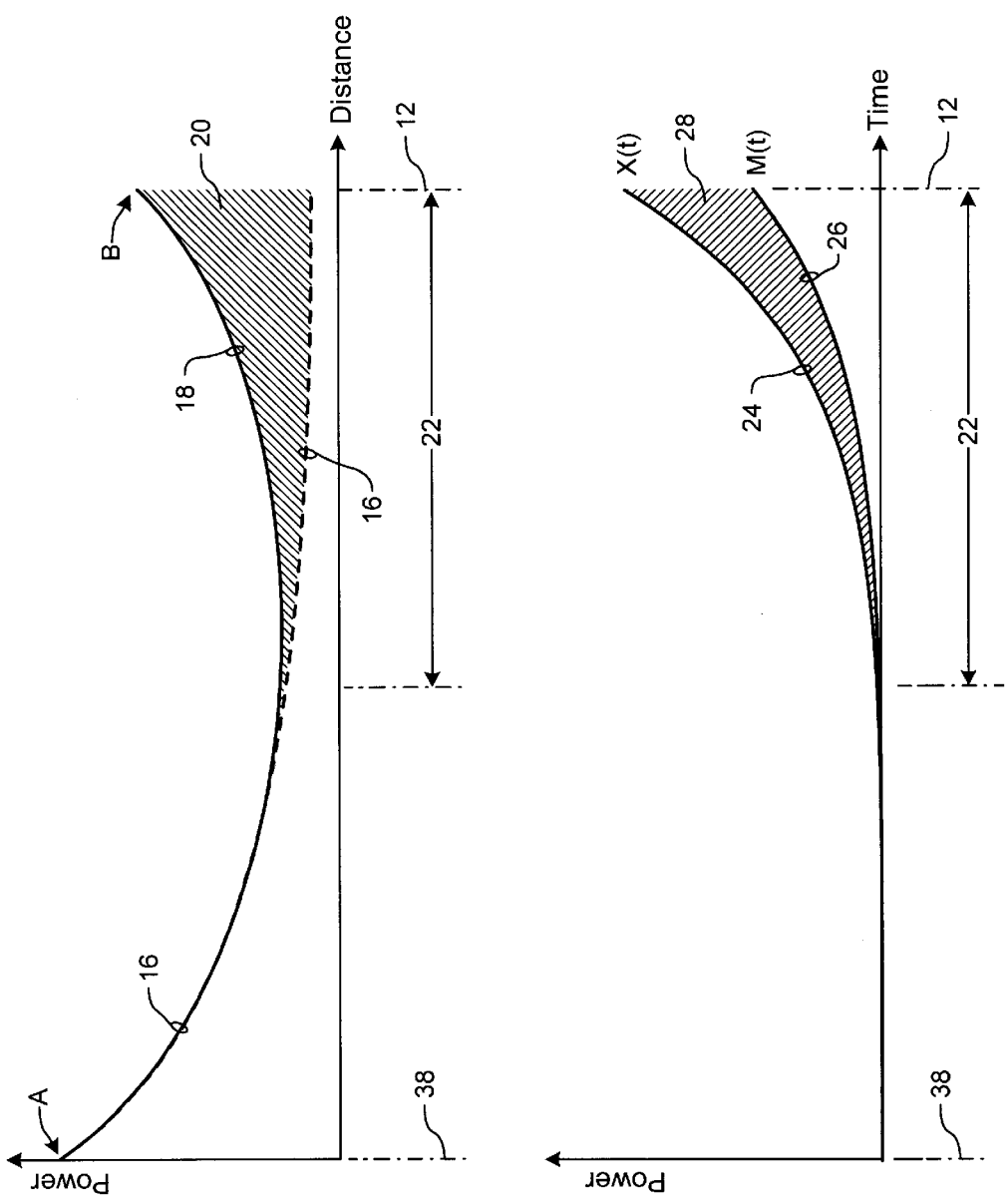
FIG. 2 is a graph showing an exemplary power distribution of a data signal propagating in an optical transmission system, and illustrating signal gain due to Raman pumping, as a function of distance in the optical transmission system of FIG. 1.
FIG. 3 is a graph showing exemplary power distribution curves of monitored low frequency modulation of the residual pump laser signal, and cross-talk between the data signal and the pump laser signal, respectively, as a function of distance in the optical transmission system of FIG. 1.

As shown in FIG. 2, the optical power of a data signal decays (approximately exponentially) with distance, starting at a peak power (at A on the power distribution curve 16), which is progressively attenuated with increasing propagation distance through the waveguide 6. Optical power of the pump laser signal injected by the pump laser 10 is coupled to the data signal, which progressively amplifies the data signal as it approaches the injection point 12, as shown by curve 18 in FIG. 2. This progressive amplification causes an increase in the data signal optical power (or at least mitigates attenuation) to yield a received signal power (at B, in FIG. 2) as the data signal propagates past the injection point. In FIG. 2, the shaded region 20 between curves 16 and 18 represents the signal gain due to Raman pumping.

As shown in FIG. 2, signal gain due to Raman pumping is normally a maximum at the injection point 12 of the pump laser signal into the waveguide 6, and decays with distance as the pump laser signal propagates toward the sending node 4a. At some point, the gain becomes negligibly small, so that it is possible to define a gain region 22 within the waveguide 6, the length of which will normally be based on an arbitrary minimum gain threshold, rather than any distinct change within the waveguide. Within the gain region 22, signal gain is a complex function of pump injection power (which is known), data signal power(s), and position within the waveguide 6. In multi-channel communications systems (such as Wave Division Multiplexed [WDM] and Dense Wave Division Multiplexed [DWDM] systems), Raman scattering phenomena causes coupling of optical power between all of the signals within the waveguide 6. Thus optical power is coupled between each of the data signals and the pump laser signal, which generally produces amplification of the data signals, and attenuation of the pump laser signal. Additionally, optical power is coupled between each of the data signals, resulting in further attenuation or amplification of the data signals. The present invention provides a method and system for evaluating the distribution of gain within the gain region, as a function of position (i.e. length).

In accordance with the present invention, distributed gain is evaluated by determining cross-talk between the data signal and the pump laser signal, and then estimating gain from the cross-talk. As is known in the art, cross coupling of optical power between the pump laser signal and the data signal causes amplification of the data signal. This, as stated above, is the basis of Raman pumping. However, this cross-coupling is symmetrical, in that it is also accompanied by cross-talk between the data signal and the laser pump signal, resulting in modulation of the (originally un-modulated) laser pump signal reflecting (or correlated with) modulation of the data signal. This effect is especially strong at lower frequencies, and particularly at frequencies of $10^6$ Hz or less. As will be described in greater detail below, it is therefore possible to correlate low frequency components in the data signal with modulation of the pump laser signal, to determine a distribution of cross-talk within the waveguide 6.

The relationship between cross-talk and gain, for any combination of pump laser and data signal wavelengths, may be determined by various analytical and/or empirical methods, which are known in the art and thus will not be described in detail herein. In general, for any given data signal frequency, cross-talk is proportional to the gain. Thus the distribution of cross-talk within the waveguide 6 will typically follow the distribution of gain (illustrated by the shaded region 20 between curves 16 and 18 of FIG. 2) within the waveguide 6, as shown by curve 24 in FIG. 3. In essence, at any location of interest within the waveguide 6, the pump laser signal will be modulated by cross-talk from the data signal. The amount of this modulation will depend on the signal gain due to Raman pumping at that location. This modulation will then propagate toward the sending node 4a. As it does so, both the pump laser signal and the modulation are attenuated, so that the residual pump laser signal arriving at the sending node 4a contains the effects of both cross-talk and attenuation. Accordingly, evaluating a cross-talk distribution based on analysis of modulation of the residual pump laser signal yields an "attenuated" cross-talk distribution, such as may be represented by curve 26 in FIG. 3. The effects of attenuation (illustrated by the shaded region 28 between curves 24 and 26 of FIG. 3) can be extracted from this attenuated cross-talk distribution using the optical power distribution curve of the pump laser signal (determined, for example, following the techniques described in U.S. Pat. No. 6,072,614 (Roberts)).

As shown in FIG. 1, a system 30 for evaluating distributed gain in accordance with the present invention comprises a data signal monitor 32, a residual pump laser signal monitor 34 coupled to the waveguide 6 via a wavelength-selective coupler 35, and a processing unit 36 adapted to process the monitored signals. In general, the respective data signal and residual pump laser signal monitors 32 and 34 may be arranged to monitor respective signals at arbitrary locations within the waveguide 6. As may be appreciated, the monitors may be located at the same, or at different locations along the waveguide 6, as any differences in location can be mathematically accounted for during processing of the monitored signals. In all cases, however, it is preferable for both of the monitors 32 and 34 to be located upstream of the region of interest within the waveguide 6 (in terms of the forward propagation direction of the data signal). In the illustrated embodiment, the monitors 32 and 34 are located at a common predetermined detection point 38, which is located upstream of the expected gain region 22. Conveniently, the detection point 38 may be located proximal the sending node 4a, as shown in FIG. 1. Principle operations of the embodiment of system 30 of FIG. 1 are illustrated in greater detail in FIG. 4.

Figure 4:
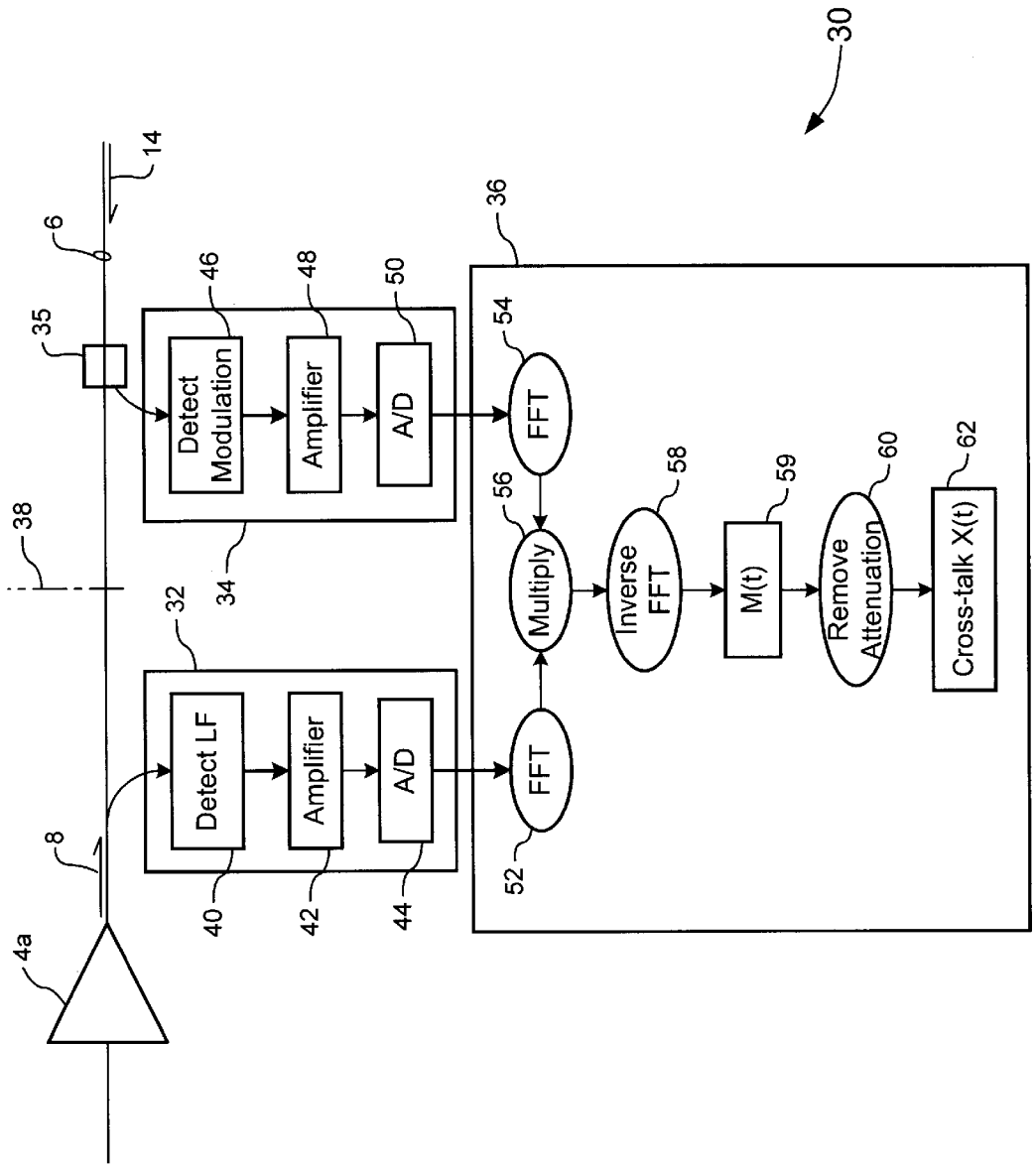
FIG. 4 is a block diagram schematically illustrating principle steps in a process for evaluating distributed gain in an optical transmission system in accordance with an embodiment of the present invention.

As shown in FIG. 4, the data signal monitor 32 operates to monitor the data signal as it propagates towards the receiving node 4b. Thus a portion of the data signal may be tapped, and the tapped signal supplied to a low frequency detector 40, which operates to detect one or more predetermined low frequency components of the data signal. These low frequency components may include any of:

an energy spectrum of the data signal (e.g. the repeating energy spectrum of frame headers within the data signal);

optical power dither, which may be inherent to the data signal, or introduced selectively in order to enable evaluation of distributed gain;

frequency dither; and rotation of the direction of polarization of the data signal.

In multi-channel optical transmission systems, such as wave division multiplexed (WDM) and dense wave division multiplexed (DWDM) networks, it is preferable to use dither (of either power, frequency or polarization direction), which can be selectively imposed on any one channel. This enables distributed gain to be evaluated on a channel-by-channel basis.

The detected low frequency component is then amplified (if necessary) by an amplifier 42 and then sampled by an analog-to-digital (A/D) converter 44. The sample data generated by the A/D converter 44 is then supplied to the processing unit 36.

Similarly, the residual pump signal monitor 34 operates to monitor the residual pump signal as it propagates towards the sending node 4a. Thus the wavelength-selective coupler 35 operates to tap optical signals propagating in the reverse direction 14 and having the pump laser signal frequency (so as to filter out any reflected data signals), to extract at least a portion of the residual pump laser signal from the waveguide 6. The extracted residual pump laser signal is then supplied to a low frequency detector 46, which operates to detect a low frequency modulation corresponding with the monitored low frequency components of the data signal. In general, this low frequency modulation will take the form of optical power modulation (independent of the nature of the low frequency components in the data signal) having a frequency corresponding to that of the monitored low frequency components of the data signal. The detected low frequency modulation of the residual pump signal is amplified, as required by an amplifier 48, and sampled by an A/D converter 50. The sample data generated by the A/D converter 50 is then supplied to the processing unit 36.

The processing unit 36 operates to correlate the monitored low frequency components of the data signal with the residual pump modulation, as a function of time, and then extract the effects of pump laser signal attenuation to obtain a distribution of cross-talk as a function of position within the waveguide 6.

Correlation of the monitored low frequency components of the data signal with the residual pump modulation, as a function of time, can be accomplished by any one of a variety of known techniques. For example, a method analogous to that described in U.S. Pat. No. 6,072,614 (Roberts) may conveniently be used, as described below with reference to FIG. 4. Thus the sample data generated by the A/D converters 44 and 50, are converted to the frequency domain by means of respective Fast Fourier Transforms (at 52 and 54). These Fast Fourier Transforms are then multiplied (at 56), to yield a correlation transform defining a frequency domain correlation between the two signals. The correlation transform can then be converted back into the time domain by computing the inverse-Fast Fourier Transform of the correlation transform (at 58), which yields a power distribution array defining the attenuated cross-talk distribution curve 26 (see FIG. 3) as a function of time. The time dimension in this case represents the round-trip time delay between transmission of the low frequency components of the data signal past the detection point 38 (see FIG. 1), and detection of the corresponding modulation of the residual pump laser signal. Thus the time-domain power distribution array can readily be used to calculated (attenuated) cross-talk as a function of location, by using the known speed of light in the waveguide 6 and the round-trip time delay to compute distances relative to the detection point 38.

Extraction of the effects of pump laser signal attenuation (at 60), from the power distribution array, yields the cross-talk distribution 62 (curve 24 in FIG. 3). As described above, the gain at any location of interest can then be evaluated using the cross-talk distribution and the previously determined proportionality function between gain and cross-talk.

Thus, it is seen that the present invention provides a method and a system for monitoring distributed gain as a function of length in an optical transmission system.

The embodiment(s) of the invention described above is (are) intended to be exemplary only. The scope of the invention is therefore intended to be limited solely by the scope of the appended claims.

I claim:

1. A method of monitoring distributed gain in an optical waveguide, the method comprising steps of:

determining cross-talk between a first optical signal and a second optical signal as a function of location within the waveguide; and evaluating the distributed gain from the cross-talk.

2. A method as claimed in claim 1, wherein the first optical signal is a data signal, and the second optical signal is a pump laser signal.

3. A method as claimed in claim 1, wherein the step of determining cross-talk between the first optical signal and the second optical signal comprises steps of:

monitoring at a predetermined detection point a low frequency component of the first optical signal;

monitoring a low frequency modulation of the second optical signal consistent with the low frequency component of the first optical signal;

determining a correlation as a function of time delay between transmission of the low frequency component of the first optical signal past the detection point and reception of the low frequency modulation of the second optical signal; and evaluating cross-talk as a function of length from the correlation.

4. A method as claimed in claim 3, wherein the predetermined detection point is located up-stream of a gain region of the waveguide, relative to a propagation direction of the first optical signal.

5. A method as claimed in claim 3, wherein the low frequency component of the first optical signal comprises any one of:

an energy spectrum of the first optical signal;

optical power dither of the first optical signal;

optical frequency dither of the first optical signal; and rotation of a polarization direction of the first optical signal.

6. A method as claimed in claim 5, wherein the low frequency component of the first optical signal has a frequency on the order of $10^6$ Hz, or less.

7. A method as claimed in claim 3, wherein the low frequency modulation of the second optical signal comprises an optical power modulation of the second optical signal.

8. A method as claimed in claim 7, wherein the low frequency modulation of the second optical signal has a frequency corresponding to that of the monitored low frequency component of the first optical signal.

9. A method as claimed in claim 3, wherein the step of evaluating cross-talk as a function of length comprises steps of:
removing an effect of attenuation of the second optical signal from the correlation; and
converting time delay into a distance relative to the detection point.

10. A method as claimed in claim 1, wherein the step of evaluating the distributed gain from the cross-talk comprises a step of applying a predetermined proportionality function to the cross-talk.

11. A system adapted to monitor distributed gain in an optical waveguide, the system comprising:
means for determining cross-talk between a first optical signal and a second optical signal as a function of location within the waveguide; and
means for evaluating the distributed gain from the cross-talk.

12. A system as claimed in claim 11, wherein the first optical signal is a data signal, and the second optical signal is a pump laser signal.

13. A system as claimed in claim 11, wherein the means for determining cross-talk between the data signal and the pump laser comprises:
a first detector disposed at a predetermined detection point of the optical waveguide, the first detector being adapted to monitor a low frequency component of the first optical signal;
a second detector adapted to monitor a low frequency modulation of the second optical signal consistent with the low frequency component of the first optical signal;
means for determining a correlation as a function of time delay between transmission of the low frequency component of the first optical signal past the detection point and reception of the low frequency modulation of the second optical signal; and
means for evaluating cross-talk as a function of length from the correlation.

14. A system as claimed in claim 13, wherein the predetermined detection point is located up-stream of a gain region of the waveguide, relative to a propagation direction of the first optical signal.

15. A system as claimed in claim 13, wherein the low frequency component of the first optical signal comprises any one of:
an energy spectrum of the first optical signal;
optical power dither of the first optical signal;
optical frequency dither of the first optical signal; and
rotation of a polarization direction of the first optical signal.

16. A system as claimed in claim 15, wherein the low frequency component of the first optical signal has a frequency on the order of $10^6$ Hz, or less.

17. A system as claimed in claim 13, wherein the low frequency modulation of the second optical signal comprises an optical power modulation of the second optical signal.

18. A method as claimed in claim 17, wherein the low frequency modulation of the second optical signal has a frequency corresponding to that of the monitored low frequency component of the first optical signal.

19. A system as claimed in claim 13, wherein the means for evaluating cross-talk as a function of length comprises:
means for removing an effect of attenuation of the second optical signal from the correlation; and
means for converting time delay into a distance relative to the detection point.

20. A system as claimed in claim 11, wherein the means for evaluating the distributed gain from the cross-talk comprises means for applying a predetermined proportionality function to the cross-talk.

* * * * *